UNITED STATES PATENT OFFICE.

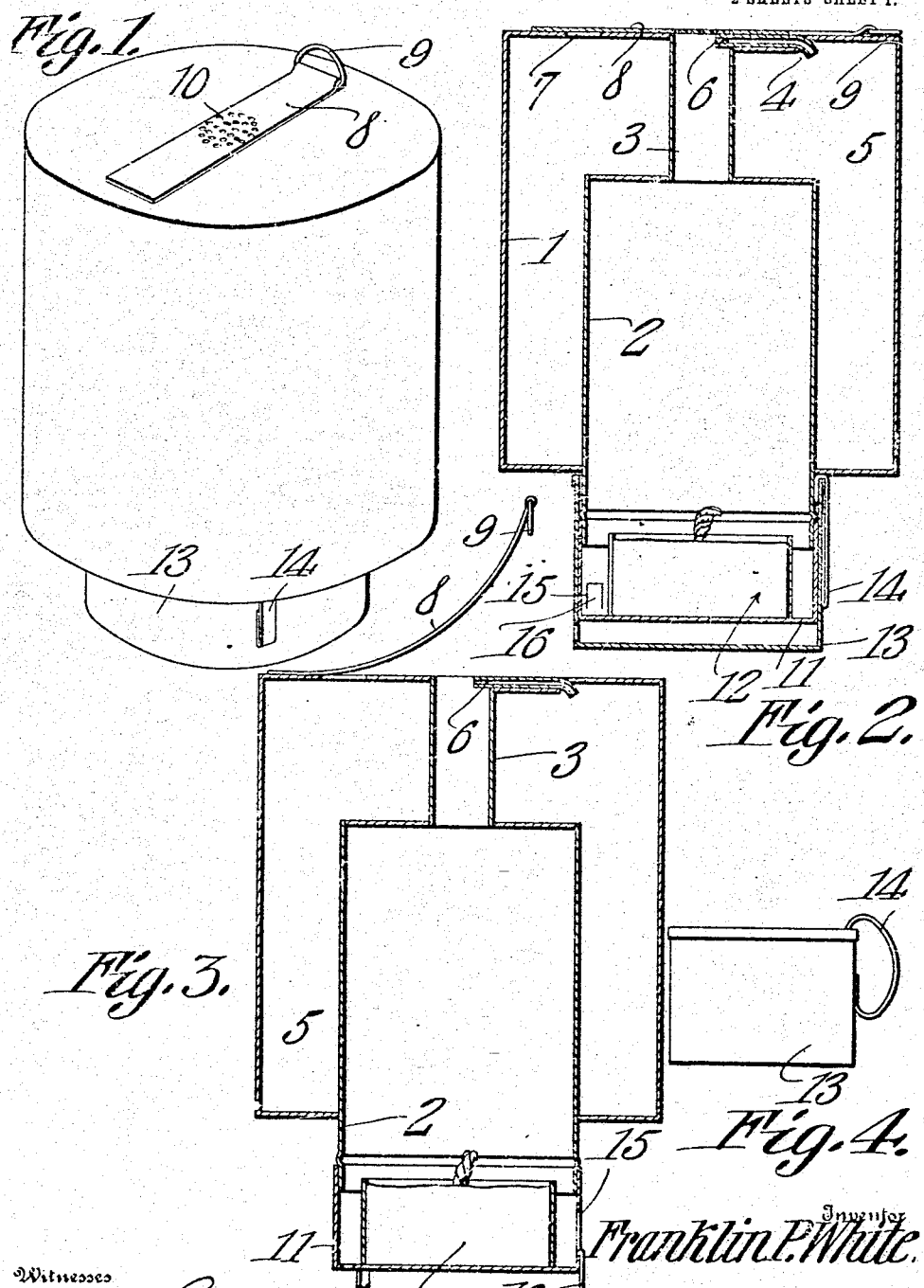

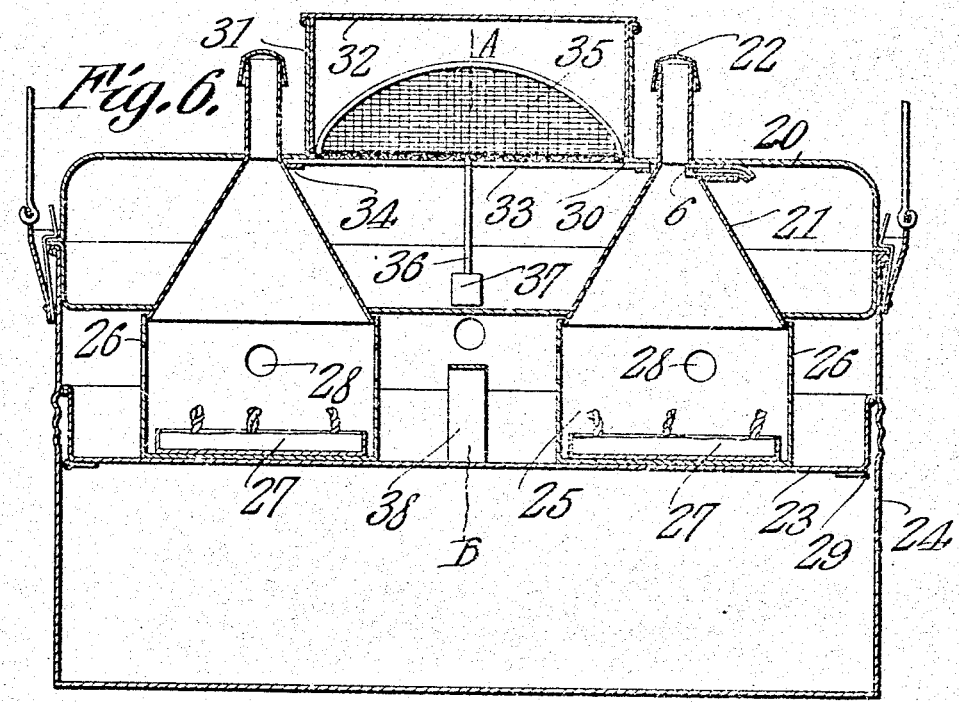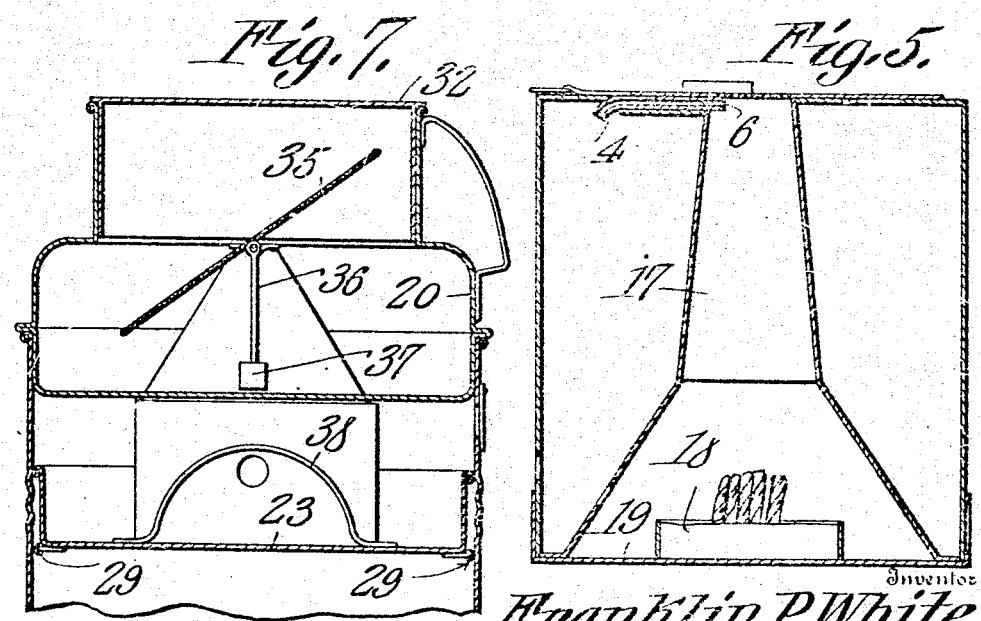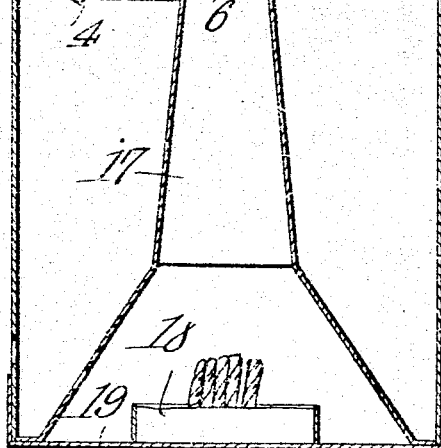

FRANKLIN P. WHITE, OF SHALLOTTE, NORTH CAROLINA.

COMBINED CAN AND COOKER.

972,304.

Specification of Letters Patent.

Patented Oct. 11, 1910.

Application filed October 11, 1909. Serial No. 522,041.

*To all whom it may concern:*

Be it known that I, FRANKLIN P. WHITE, a citizen of the United States, residing at Shallotte, in the county of Brunswick and State of North Carolina, have invented a new and useful Combined Can and Cooker, of which the following is a specification.

This invention relates to cans and similar receptacles of that type ordinarily utilized for containing soups, cooked vegetables, and various forms of beverages which are placed on the market ready to be consumed after being heated.

The principal object of the present invention is to combine a heater with a receptacle of this type, the heater constituting a permanent part thereof, and including a heating means which, when lighted, will thoroughly heat the contents of the receptacle.

Another object is to provide a receptacle which is so constructed as to convey the products of combustion therethrough and present the greatest possible heating surface to the contents of the receptacle.

Another object is to provide a device of this character which is compact in construction, comparatively cheap to manufacture, and which can be readily set up for use, means being provided whereby the explosion of the receptacle is prevented.

With these and other objects in view the invention consists in certain novel details of construction and the combinations of parts hereinafter more fully described and pointed out in the claims.

In the accompanying drawings the preferred forms of the invention have been shown.

In said drawings:—Figure 1 is a perspective view of a can embodying the present improvements. Fig. 2 is a vertical section therethrough, the parts being shown in their normal position. Fig. 3 is another section through the can and showing the relative positions of the parts while the contents of the can are being heated. Fig. 4 is a detail view of the cup to be sold with the can, the handle of the cup being extended outward ready for use. Fig. 5 is a vertical section through a modified form of can. Fig. 6 is a vertical longitudinal section through a lunch pail having the present improvement embodied therein. Fig. 7 is a section on the line A—B of Fig. 6.

Referring to the figures by characters of reference, 1 designates a can of any suitable size and proportions, said can being provided with a central heating flue 2, extending beyond the bottom of the can and provided at its upper end with a reduced portion 3 constituting a chimney and opening through the top of the can. The compartment formed around the flue 2 and its reduced portion 3 is designed to be filled with the material to be warmed, this material being either a soup, a vegetable, or some form of beverage. A vent tube extends from this compartment 5 and opens into the upper portion of the chimney 3, this tube being indicated at 4. The discharge end of the tube is preferably closed by means of a wax or a soft solder as shown at 6. This sealing material serves to prevent air from entering the compartment 5 under ordinary conditions. An opening 7 is formed in the upper end of the can and is normally closed by a band 8 which is soldered to or formed with the can at one end of said strip, the other end of the strip being provided with a ring 9 or the like whereby the can may be conveniently manipulated while hot. That portion of the strip adjacent the ring 9 as well as the longitudinal edges of said strip are attached to the top of the can by means of a soft solder, this strip therefore serving to normally close the opening 7. The middle portion of the strip extends across the outlet end of the chimney 3 and in order to permit the free circulation of gases from the chimney, a series of apertures 10 are formed within the strip above the chimney.

The lower projecting portion of the flue 2 is designed to be frictionally engaged by a member 11 having a candle 12 or other form of heating device therein. This member is designed to be inclosed by a cup 13 having a metal strip 14 attached thereto, said strip being normally folded against the cup as shown in Fig. 2. Incisions 15 are cut into the member 11 to form tongues 16 therebetween, these tongues being designed to be bent downward below the bottom of the cap so as to form legs for the purpose of supporting the member out of contact with the surface on which the device is mounted.

It is to be understood that when a can embodying the present improvements is placed upon the market the cup 13 conceals the cap 11 and the handle 14 is pressed against the cup as shown in Fig. 2. The candle 12 moreover is arranged upon the bottom of the cap and the strip 8 is in closed position. When it is desired to heat the contents of the can the cup 13 is removed and the cap 11 is then also removed. The candle 12 is then ignited and the said cap is then returned to the lower end of the flue. The hot gases produced by the burning candle pass through the flue 2 and the reduced portion 3 thereof and out through the openings 10. The heat will be sufficient to melt the sealing material 6 so as to permit any generated steam to pass from this compartment 5 and through the tube 4 to the chimney 3. The heat will also melt the soft solder holding the strip 8 in lowered position and therefore said strip will curl upward from the can as indicated in Fig. 3 and expose the outlet opening 7. After the contents of the can have been properly heated they can be poured therefrom through the outlet 7 and into the cup 13, it being understood that the strip 14 is to be first bent outward as indicated in Fig. 4 so as to form a handle. It is to be understood that before the candle 12 is lighted, the tongues 16 are to be bent downward so as to form legs to support the can above the surface on which the legs are mounted.

Instead of providing the can with a central flue which extends below the bottom of the can, a tapered flue 17 may be arranged within the can as shown in Fig. 5, the lower end of the flue being of substantially the same diameter as the can so as to be large enough to receive a candle 18 mounted on a cap 19 which is designed to be placed in frictional engagement with the bottom of the can.

As shown in Figs. 6 and 7 the present improvements can be very readily applied to dinner pails. By referring to these figures it will be seen that the coffee receptacle 20 has one or more flues 21 extending therethrough and projecting thereabove, each flue having a cap 22 for closing the upper end thereof. A tray 23 is removably mounted within the body 24 of the dinner pail and this tray has pockets or compartments 25 formed thereon by means of upstanding rings 26, each of these compartments being designed to receive a candle 27 or other suitable form of heater. Openings 28 are formed within the rings 26 to permit a sufficient amount of air to enter the compartments to support combustion. The tray 23 is mounted on fixed supports 29 located within the body 24 and an outlet opening 30 is formed in the top of the receptacle 20 and is surrounded by a flange 31 on which the cup 32 is designed to be placed. A rod 33 is arranged diametrically within the opening 30 and is pivotally supported at its ends within bearings 34, this rod having a strainer 35 attached to it and designed when in a predetermined position to extend entirely across the opening 20. An arm 36 is fixed to the rod 33 and has a weight 37 attached to it, this arm and weight being so disposed relative to the strainer 35 as to hold the strainer normally in an inclined position, as shown in Fig. 7. When the dinner pail is tilted in one direction however, the screen will automatically close and thus strain the coffee or other liquid poured from the receptacle 20. A handle 38 is preferably connected to the middle portion of the tray 23 to facilitate the removal thereof.

Although the various forms of devices have been shown as supplied with handles for the purpose of heating the contents thereof, it is to be understood that any suitable means may be employed for this purpose.

It is to be understood, of course, that various changes may be made in the construction and arrangement of parts without departing from the spirit or sacrificing any of the advantages of the invention.

What is claimed is:

1. A combined storage and heating receptacle including a body having a compartment therein, a heater, means for directing products of combustion from the bottom to the top of said body, a vent extending from the compartment and opening into said means, and a sealing medium within the vent.

2. A combined storage and heating receptacle including a body having a compartment therein, a heating flue extending through the body, a heater within the flue, a vent extending from the compartment and opening into the flue, and sealing means for the vent.

3. A combined storage and heating receptacle including a body, a heating flue extending therethrough, a heater removably mounted in one end of the flue, a vent tube opening into the flue from the interior of the body, a sealing material within the tube and disposed to be softened and released by the heat generated within the flue.

4. A combined heating and storage receptacle including a body having an outlet, a heating flue extending through the body, a sealing strip attached to the body and normally closing the outlet, a vent tube extending into the flue from the interior of the body, and sealing means within the tube, said means being disposed to be softened and the strip loosened by the heat generated within the flue.

5. A combined storage and heating receptacle including a body, a heating flue extending therethrough, there being an outlet opening within the body, a sealing strip, and means for holding said strip in position on the receptacle to close the opening, said means being designed to be softened to release the strip when heated.

6. A device of the class described including a receptacle, a heating flue therein, a heater removably mounted within the flue, a vent tube opening into the flue from the interior of the receptacle, sealing means within the tube and designed to be softened by the heat within the flue, there being an outlet within the wall of the receptacle, a strip for closing the outlet and means for securing the strip in closed position, said means being designed to be softened by the heat within the flue.

7. A device of the class described including a receptacle, a flue extending therethrough, a heater detachably mounted within the lower portion of the flue, said receptacle having an outlet, a strip extending across one end of the flue and the outlet, said strip having apertures registering with the flue, means for attaching the strip to the receptacle to close the outlet, said means being affected by the action of heat to release the strip.

8. A device of the class described including a receptacle, a flue extending therethrough, a closure for the receptacle, means for holding the closure in closed position, said means being susceptible to the action of heat to release the closure, a vent tube extending from the interior of the receptacle to the flue, sealing means therefor designed to be softened by the action of heat, a cap removably connected to the receptacle and constituting heater supporting means, and tongues integral with the cap and bendable therebeyond to constitute supporting legs.

9. A combined storage and heating receptacle including a body, a heater removably mounted upon the body, a vent extending from the body, and a sealing material within the vent and disposed to be softened and released by the heat generated within the heater.

In testimony that I claim the foregoing as my own, I have hereto affixed my signature in the presence of two witnesses.

FRANKLIN P. WHITE.

Witnesses:
E. G. SWAIN,
S. E. WHITE.